United States Patent [19]
Degawa

[11] Patent Number: 5,227,869
[45] Date of Patent: Jul. 13, 1993

[54] METHOD FOR CORRECTING CONTOUR OF IMAGE

[75] Inventor: Katsumi Degawa, Kawasaki, Japan

[73] Assignee: Ikegami Tsushinki Co., Ltd., Tokyo, Japan

[21] Appl. No.: 745,200

[22] Filed: Aug. 15, 1991

[30] Foreign Application Priority Data

Aug. 20, 1990 [JP] Japan .................. 2-217206

[51] Int. Cl.⁵ .............................. H04N 9/64
[52] U.S. Cl. ........................ 358/37; 358/166
[58] Field of Search ............ 358/37, 36, 21 R, 166, 358/162, 167, 160, 96

[56] References Cited

U.S. PATENT DOCUMENTS

| 3,732,360 | 5/1973 | Breimer et al. | |
| 4,748,500 | 5/1988 | Lacoste et al. | 358/37 |
| 4,823,190 | 4/1989 | Yamamoto | 358/37 |
| 4,876,599 | 10/1989 | Kihara | 358/37 |

FOREIGN PATENT DOCUMENTS

| 2823617 | 12/1978 | Fed. Rep. of Germany. | |
| 0127375 | 8/1982 | Japan | 358/37 |
| 0295787 | 12/1986 | Japan | 358/37 |
| 63-90283 | 4/1988 | Japan. | |

OTHER PUBLICATIONS

English-language Abstract of 63-90283.

Primary Examiner—James J. Groody
Assistant Examiner—Michael H. Lee
Attorney, Agent, or Firm—Spencer, Frank & Schneider

[57] ABSTRACT

A method for correcting the contour of an image, in which contour signals are independently extracted from image signals obtained in a plurality of channels; the thus extracted contour signals are mixed with each other at a fixed or variable mixing ratio to produce a contour correction signals; and the thus obtained contour correction signals are added to the image signals in the respective channels. Therefore, the noise included in the contour signals are averaged so as to be decreased; and thus it is possible to prevent the decrease the SN ratio of the image signals, which is caused by correcting the contour of the image. Further, since the contour signals are independently extracted in each channel, it is possible to independently correct the contour of the image in each channel.

9 Claims, 7 Drawing Sheets

Signal T

Signal M

Signal B

T+B

2M−T−B

Contour Corrected Image Signal

FIG. 4A Input Image Signal
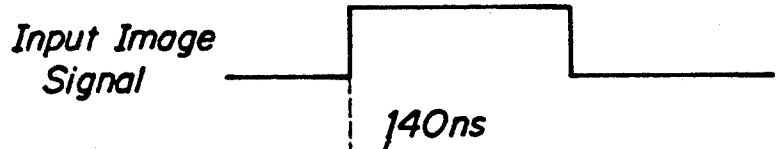
FIG. 4B Signal C
FIG. 4C Signal D
FIG. 4D C-D
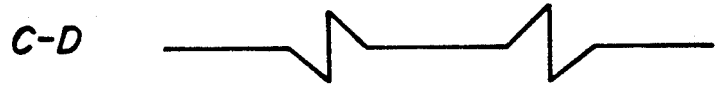
FIG. 4E Contour Corrected Image Signal

METHOD FOR CORRECTING CONTOUR OF IMAGE

BACKGROUND OF THE INVENTION

1) Field of the Invention

The present invention relates to a method for correcting or enhancing a contour of a color image, in which a contour correction signal in either or both of the vertical and horizontal directions are produced from image signals appeared in a plurality of channels; and the contour correction signal is added to the image signals of the respective channels to correct the contour of the color image.

2) Prior Art Statement

Hitherto, there have been known various methods for correcting the contour of a color image such as an out-of-green, a three-channel method and a brightness method. In the out of green method, the contour signal is derived from a green color signal appearing in a green color signal channel and the contour signal thus derived from the green color signal is added to image signals in respective channels of red, blue and green as a contour correction signal; in the three-channel method, contour signals are extracted from red, green and blue color signals appearing on the respective red, green and blue channels and the contour signals are added to the respective color image signals as contour correction signals; and in the brightness method at first a brightness signal is produced by mixing color image signals, a contour signal is derived from the brightness signal, and then the contour signal is superimposed on the color image signals in the respective color channels as a contour correction signal.

The above-mentioned three channel contour correcting method is disclosed in, for instance, "HOSO GIJUTU" issued on December, 1982, Vol. 35, No. 12, pp 77; and the brightness contour correcting method in Japanese Patent Preliminarily Publication Kokai Sho No. 63-90283.

In the above-mentioned out-of-green contour correcting method, the contour correction signal is produced solely from the green color signal. Since the green color signal has a high SN ratio in itself, the contour correction signal produced from the green color signal also has a high SN ratio. However, when an image of a monochromatic object is picked up or when an image of an object is picked up under monochromatic illumination, that is to say, when there is no output in the green color channel, the contour correction signal can not be obtained, so that the displayed image can not have a sharp contour.

On the other hand, in the conventional three-channel method for an correcting the contour of image, there is a drawback in that the SN ratio is aggravated. Particularly, the SN ratio of a frequency component less than 1 MHz is remarkably decreased.

Further, in the known brightness method for correcting the contour of an image, since one contour correction signal generating circuit is commonly used in a plurality of color channels, it is impossible to give the best correction of the contour in each of the color channels. For instance, in the conventional color television camera, the sensitivity of the blue channel is lower than the sensitivities of the other red and green channels by about two or three times. Therefore, when such a television camera is used in a studio where the color temperature is generally set to about 3000 K., it is necessary to increase the gain of the blue channel of the television camera. Thus, when extracting the contour signals from the color signals, it is preferred to increase the slice level, at which noise in the signal is cut off, in the blue channel so as to be larger than those in the other channels. However, in the brightness method, it is impossible to increase the slice level of the blue channel only.

SUMMARY OF THE INVENTION

The present invention has for its purpose to provide a method for correcting a contour of a color image, in which a contour correction signal having a high SN ratio can be derived regardless of the color of the object to be picked up and the contour of the image can be independently adjusted in each color channels.

In order to carry out this purpose, the method according to the present invention comprises:

deriving contour signals from image signals appeared in a plurality of channels respectively:

mixing said contour signals with each other at a mixing ratio to generate a contour correction signal: and adding said contour correction signal to said image signals in said plurality of channels.

The reason why the SN ratio is decreased in the lower frequency band, particularly less than 1 MHz, in the known three channels method is that since the phase of the random noise of an image signal is the same as that of the random noise of the contour signal which is also produced from the image signal, the random noise is increased or folded toward the lower frequency band by adding the contour correction signal to the image signal. Therefore, if the random noise of the image signal is added to the random noise having a phase different from that of the random noise of the image signal by 180 degrees, it would be possible to improve the SN ratio. That is to say, in the present invention, the probability that random noise of the contour signals extracted from each of a plurality of channels has the same phase, and therefore, the random noise from the plurality of channels cancel or is shifted toward a higher frequency band, where the random noise is made visually inconspicuous by mixing the contour signals produced in the plurality of channels. Thus, the SN ratios of the final contour enhanced image signals can be improved. Further, in the present invention, since the contour signals are extracted from each channels independently of each other, it is possible to independently correct the contour of an image in each channel in a suitable manner.

BRIEF DESCRIPTION OF THE DRAWINGS

FIGS. 4A to 4E are schematic views representing waveforms of signals produced in the apparatus shown in FIG. 3 for explaining the function of the apparatus:

DETAILED DESCRIPTION OF THE PREFERRED EMBODIMENTS

Figure 1:
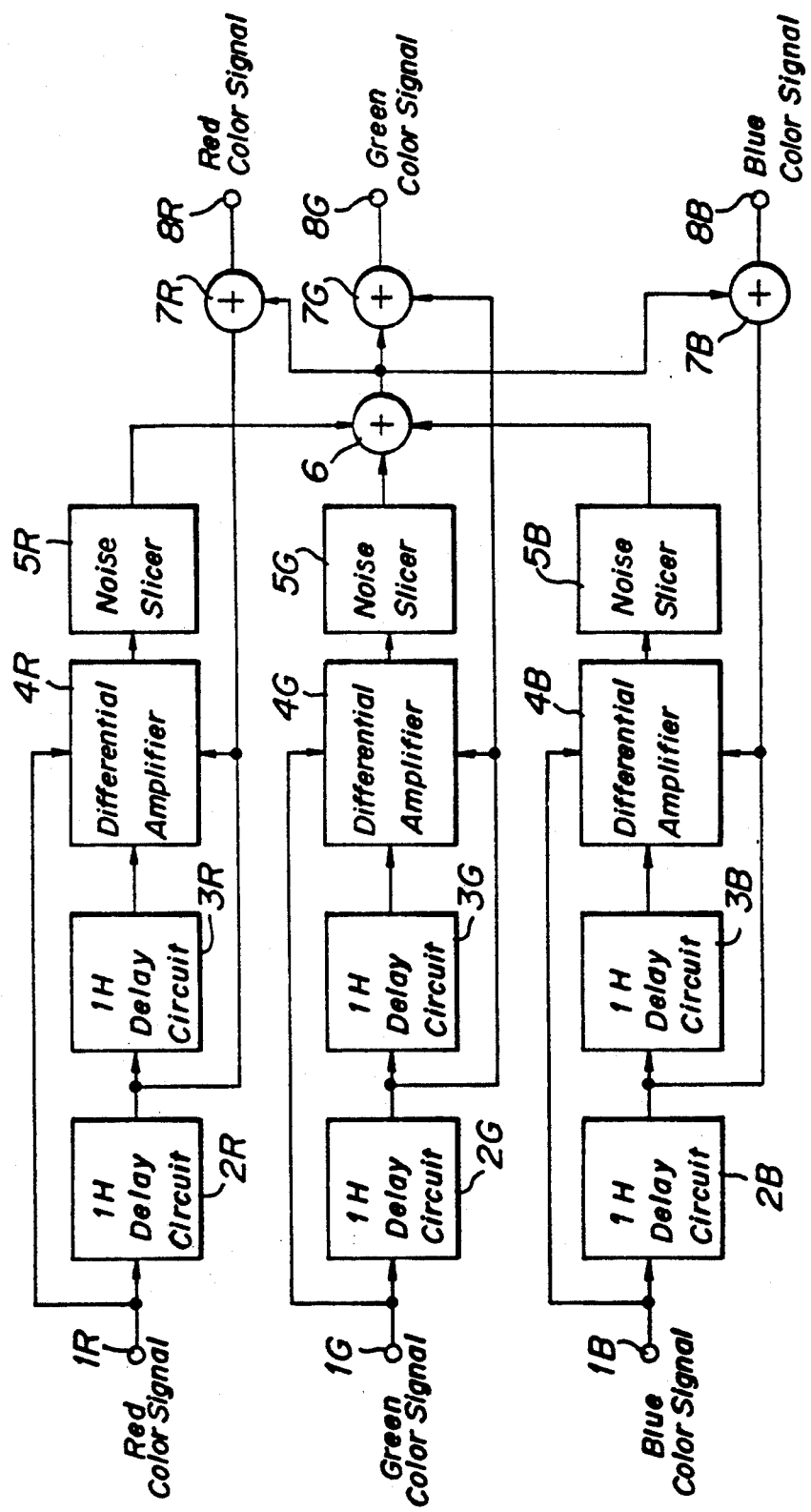
FIG. 1 is a block diagram showing the construction of an apparatus in which a first embodiment of the method for correcting the contour of an image according to the present invention is conducted.
Figure 2A:
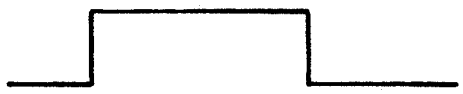
FIGS. 2A to 2F are schematic views depicting waveforms of signals produced in the apparatus shown in FIG. 1 for explaining the function of the apparatus.
Figure 2B:
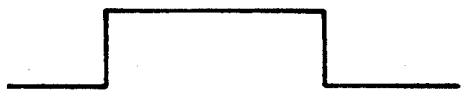
Figure 2C:
Figure 2D:
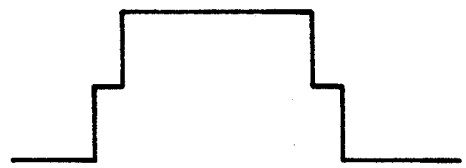
Figure 2E:

FIG. 1 is a block diagram showing the construction of an apparatus in which a first embodiment of the contour correcting method according to the invention is conducted. A red color signal, a green color signal and a blue color signal generated from a red channel, a green channel and a blue channel of a color television camera are supplied to input terminals 1R, 1G and 1B, respectively. In each of these color channels, there is provided a circuit for producing a contour signal in a vertical direction. This circuit has the same construction as that of the conventional television camera. That is to say, in the red channel, the input red color signal is successively supplied via a terminal 1R to 1H delay circuits 2R and 3R to produce a 1H delay signal and a 2H delay signal, respectively. It should be noted that "H" represents one horizontal scanning period. In the NTSC system, H is equal to about 64 μs. The non-delay signal T, the 1H delay signal M and the 2H delay signal B are depicted in FIG. 2A, 2B and 2C, respectively. The thus obtained three signals T, M and B are supplied to a differential amplifier 4R, in which a contour signal in the vertical direction (FIG. 2E) is produced by subtracting the sum (T+B) of the non-delay signal T and 2H delay signal B (FIG. 2D) from a signal 2M, which is twice the 1H delay signal M. The green and blue channels have the same construction as that of the red channel. In this manner contour signals in the vertical direction of the red color signal, green color signal and blue color signal are generated in respective channels. It should be noted that in the Figures of the present application, the same elements provided in the green and blue color channels as elements provided in the red color channel are represented by the same reference numbers with suffixes of G and B, respectively.

The contour signals derived from the differential amplifiers 4R, 4G and 4B of the respective channels are supplied to noise slicers 5R, 5G and 5B, respectively, to slice off the noise thereof. These noise slicers are constructed such that the levels at which the noise is sliced off can be independently controlled. Therefore, when using the television camera in a studio, it is possible to make the noise slice level higher in the blue channel than the noise slice levels in the other channels in order to compensate for the increased gain in the blue channel, so that it is possible to produce contour signals having optimum amplitudes.

Figure 2F:
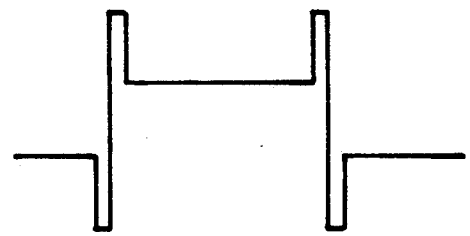

The thus extracted contour signals from the red, green and blue channels are then supplied to a mixer 6 to mix the contour signals with each other at a fixed mixing ratio to produce a contour correction signal. According to the invention, the mixing ratio can be determined arbitrarily. In the present embodiment, the contour signals are mixed together at a ratio of 0.30:0.59:0.11, which has been determined in the NTSC system. The thus produced contour correction signal is further supplied to adders 7R, 7G and 7B, in which the contour correction signal is added to the 1H delay signal M of the color signals, which are derived from 1H delay circuits 2R, 2G and 2B, respectively, as output color signals. In this manner, the red, green and blue color signals having contours in the vertical direction corrected (FIG. 2F) appear at output terminals 8R, 8G and 8B, respectively.

Figure 3:
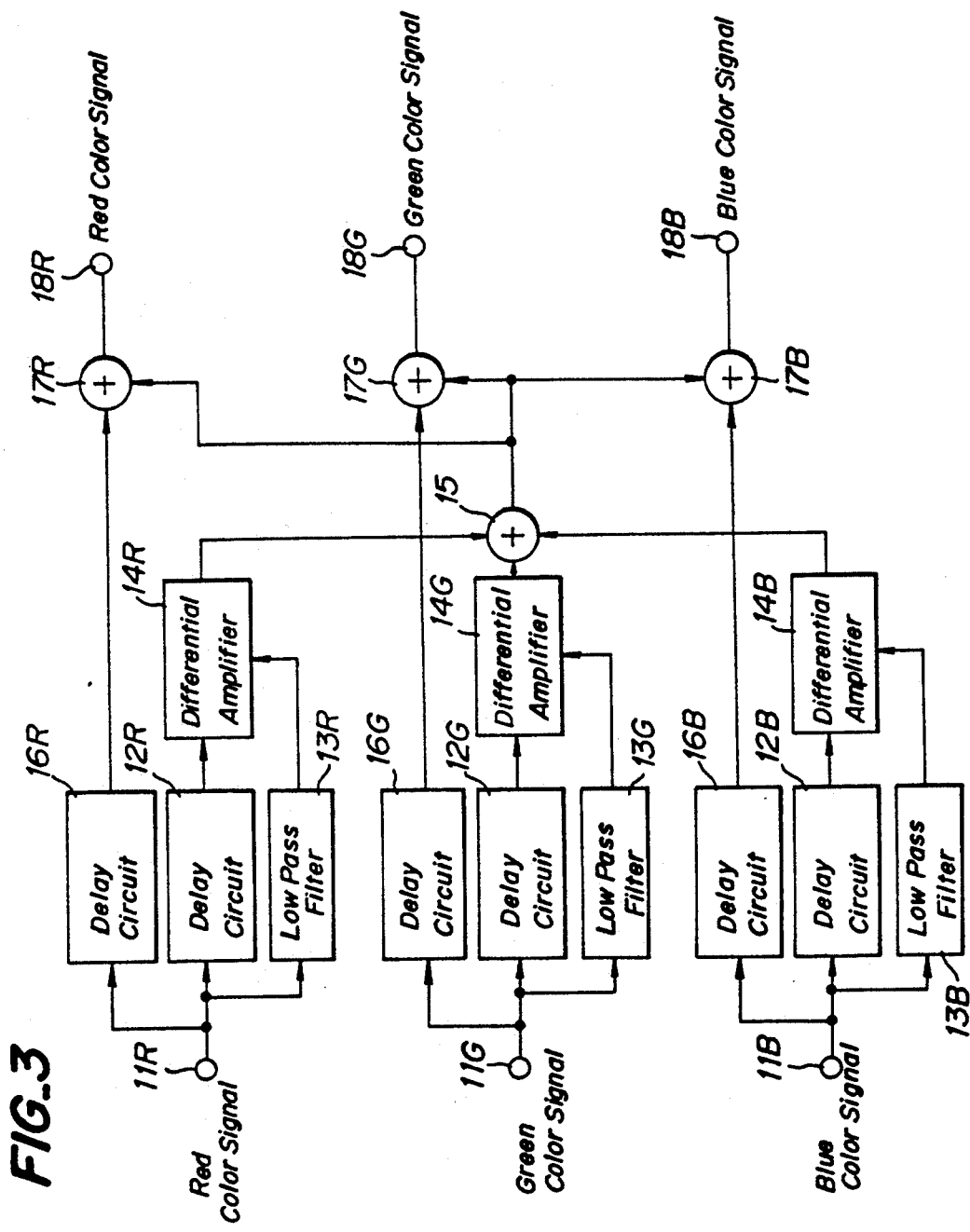
FIG. 3 is a block diagram illustrating the construction of an apparatus in which a second embodiment of the method for correcting the contour of an image according to the present invention is performed.

FIG. 3 is a block diagram showing the construction of an apparatus in which the second embodiment of the method according to the invention is carried out. In the first embodiment mentioned above, the contour of an image is corrected only in the vertical direction, but in the method according to the second embodiment the contour in the horizontal direction is corrected. As shown in FIG. 3, color signals supplied to input terminals 11R, 11G and 11B (FIG. 4A) are supplied to delay circuits 12R, 12G and 12B, respectively. Each of the delay circuits has a delay time of about 100 to 140 ns to produce a delayed signal C (FIG. 4B). At the same time, these color signals are also supplied to low pass filters 13R, 13G and 13B, respectively, to produce signals D having high frequency components removed therefrom as shown in FIG. 4C. Output signals C of the delay circuits 12R, 12G and 12B and output signals D of the low pass filters 13R, 13G and 13B are further supplied to differential amplifiers 14R, 14G and 14B, respectively, to subtract the signals D from the signals C in each channels (FIG. 4D). By the subtraction, the contour signals in the horizontal direction of the red, green and blue signals are extracted. The thus extracted contour signals are further supplied to a mixer 15 to mix the contour signals with each other at a fixed ratio. In this embodiment, the contour signals are mixed with the above mentioned NTSC mixing ratio for three primary color signals. Also in this case, any desired mixing ratio other than the NTSC mixing ratio could be applied. The desired contour correction signal (FIG. 4E) can be derived from the mixer 15.

Next, the contour correction signal is supplied to adders 17R, 17G and 17B in which the contour correction signals are added to delayed color signals, respectively, produced in delay circuits 16R, 16G and 16B. The delay circuits 16R, 16G, 16B have the same delay time as those of the delay circuits 12R, 12G and 12B. And then, image signals whose contours in the horizontal direction have been corrected can be obtained at output terminals 18R, 18G and 18B, respectively.

Figure 5:
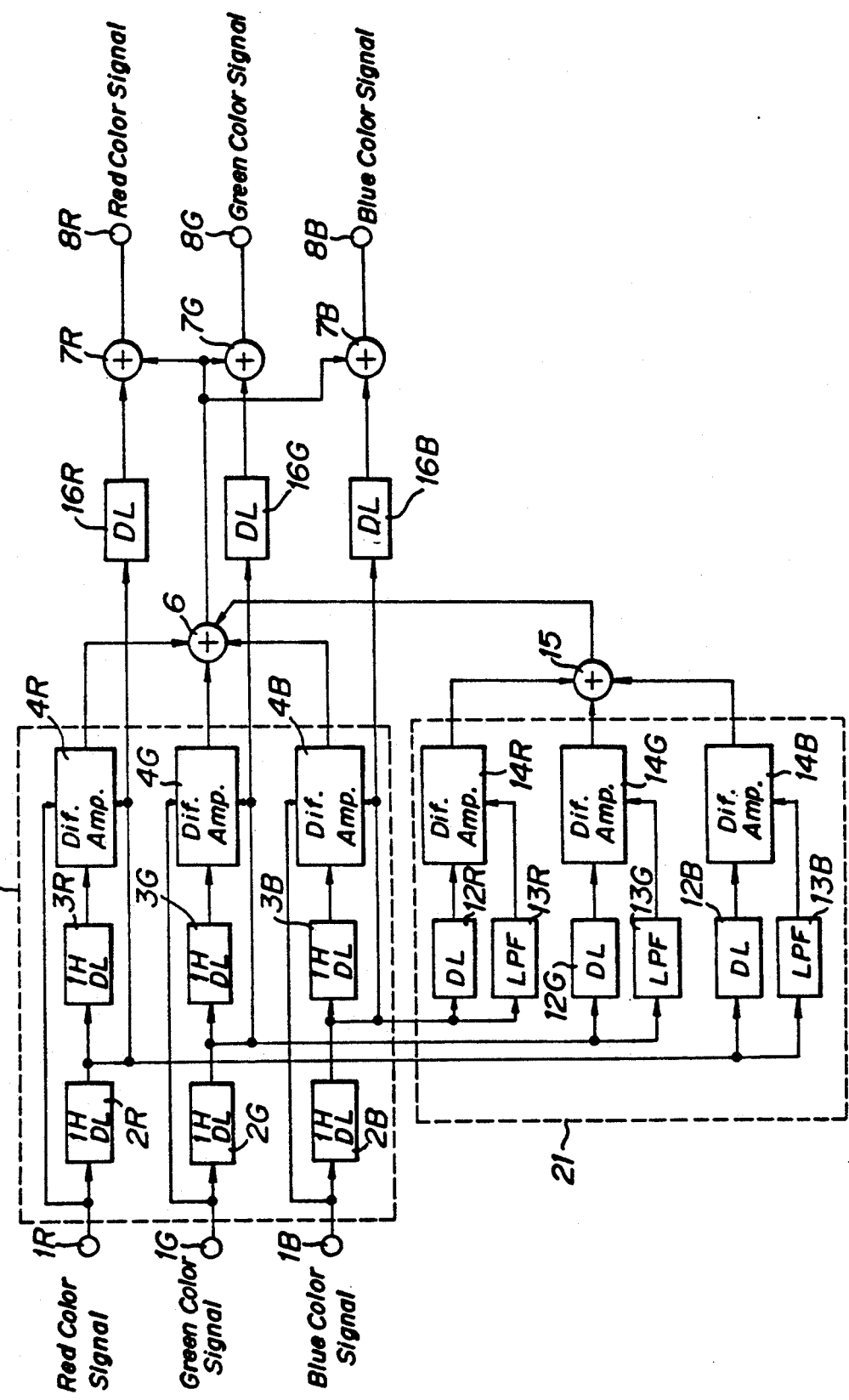
FIG. 5 is a block diagram showing an apparatus for carrying out a third embodiment of the method for FIG. 6 is a block diagram depicting an apparatus in which a fourth embodiment of the method for correcting the contour of an image according to the present invention is performed.

FIG. 5 is a block diagrams representing the construction of an apparatus in which contours of image signals both in the vertical and horizontal directions are corrected by a third embodiment of the method according to the present invention.

In the third embodiment, the same numerical references as those given to the apparatuses shown in FIGS. 3 and 5 are used for the same elements. It should be noted that a vertical contour signal producing circuit 20 is for producing contour signals in the vertical direction and a horizontal contour signal producing circuit 21 functions to extract contour correction signals in the horizontal direction. Since the circuit 20 comprises the same construction as that of the apparatus shown in FIG. 1 and the circuit 21 the same as the apparatus shown in FIG. 3, the detailed explanation thereof is omitted. The contour signals of the primary colors in the vertical direction produced in the circuit 20 are supplied to the mixer 6 to produce the vertical contour correction signal, the horizontal contour signals of the primary colors extracted in the circuit 21 are supplied to the mixer 15 to generated the horizontal contour correction signal. The thus generated horizontal contour correction signal is further supplied to the mixer 6 to produce a composite contour correction signal in the vertical and horizontal directions. The composite contour correction signal is further supplied to adders 7R, 7G and 7B to add the contour correction signal to the color signals on the main lines which have been delayed by the delay circuits 2R, 2G, 2B, 16R, 16G and 16B. And then, three primary color signals whose contours have been corrected both in the vertical and horizontal directions are obtained at the output terminals 8R, 8G and 8B. In this third embodiment, the horizontal contour correction signal obtained from the mixer 15 is mixed with the vertical contour correction signal in the mixer 6, and the mixing ratio of the horizontal contour correction signal and the vertical contour correction signal in the mixer 6 can be controlled. Additionally, the mixing ratio of the vertical contour signals in the mixer 6 and the mixing ratio of the horizontal contour signals in the mixer 15 can be controlled independently. Therefore, the contour of the image signals can be optimally controlled by controlling the mixing ratios in accordance with the situation in which the television camera is used and various special effects are required.

Figure 6:
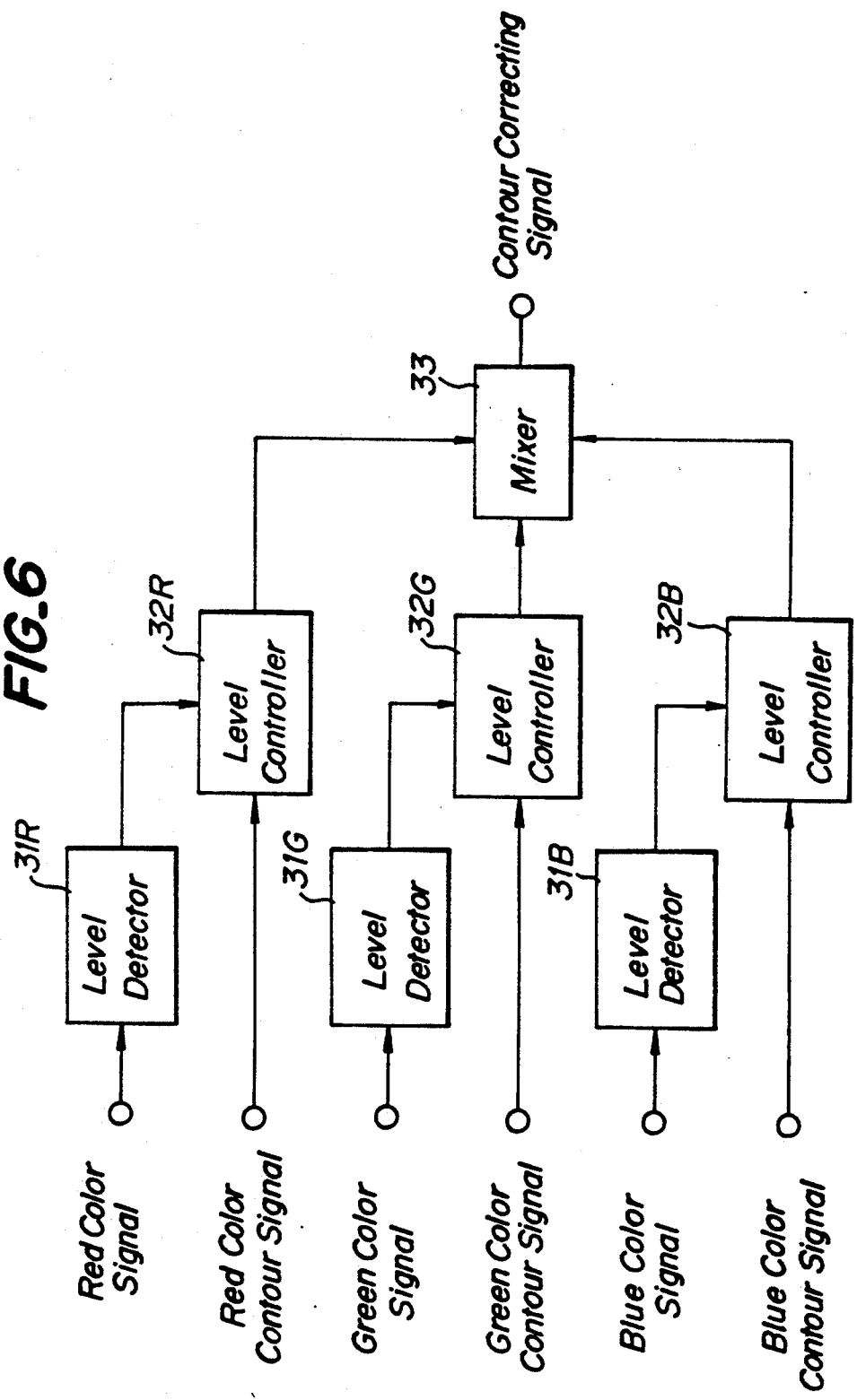

FIG. 6 is a block diagram showing the construction of an apparatus for carrying out a fourth embodiment of the method according to the invention. In the fourth embodiment, the mixing ratio, at which the contour signals extracted from the three primary signals are mixed, can be automatically controlled. As stated above, when the contour signals extracted from the three primary color signals are mixed in the mixer 6 or 15 with each other at the NTSC mixing ratio, the contour correction can not be performed correctly. According to the NTSC mixing ratio, the mixing ratio of the contour signal of the blue channel is only 11%, and therefore, when an image of a blue colored object is picked up by the television camera, the gain of the contour correction signal as a whole becomes extremely small, and it would be impossible to enhance the contour enough. In the fourth embodiment, the system is constructed such that the signal levels of the respective color signals are detected in signal level detectors 31R, 31G and 31B, and the levels of the contour signals of the respective color signals are controlled in the level controllers 32R, 32G and 32B in accordance with the thus detected signal levels. The contour signals in the respective color channels having the thus controlled levels are mixed in a mixer 33. In this case, the mixing ratio of the contour signals in the mixer 33 is fixed. However, the signal levels of the respective contour signals have been controlled in the level controllers 32R, 32G and 32B so that, it is possible to obtain substantially the same effect as when the mixing ratio of the contour signals is controlled. In case a special effect is desired under a special illuminating condition, for instance, under the condition of almost all red colored illumination, only the signal level of the image signal in the red channel becomes high but the signal levels of the image signals in the green and blue channels becomes substantially zero. In such a case, if the mixing ratio of the red, green and blue signals is fixed at, for instance, 0.3:0.59:0.11, the signal level of the contour correction signal is decreased to about 30%, so that the proper contour correction signal could not be obtained. In order to effect the optimum contour correction, the mixing ratio has to be changed to 1:0:0, otherwise the contour correction signal having a proper signal level could not be obtained because only the image signal in the red channel is present. In the fourth embodiment according to the present invention, the apparatus is constructed such that the mixing ratio of the color signals is effectively adjusted in accordance with the signal level of the image signals so as to obtain a contour correction signal having a proper signal level.

It should be noted that according to the invention, it is also possible to directly control the mixing ratio in accordance with the levels of the color signals.

Figure 7:
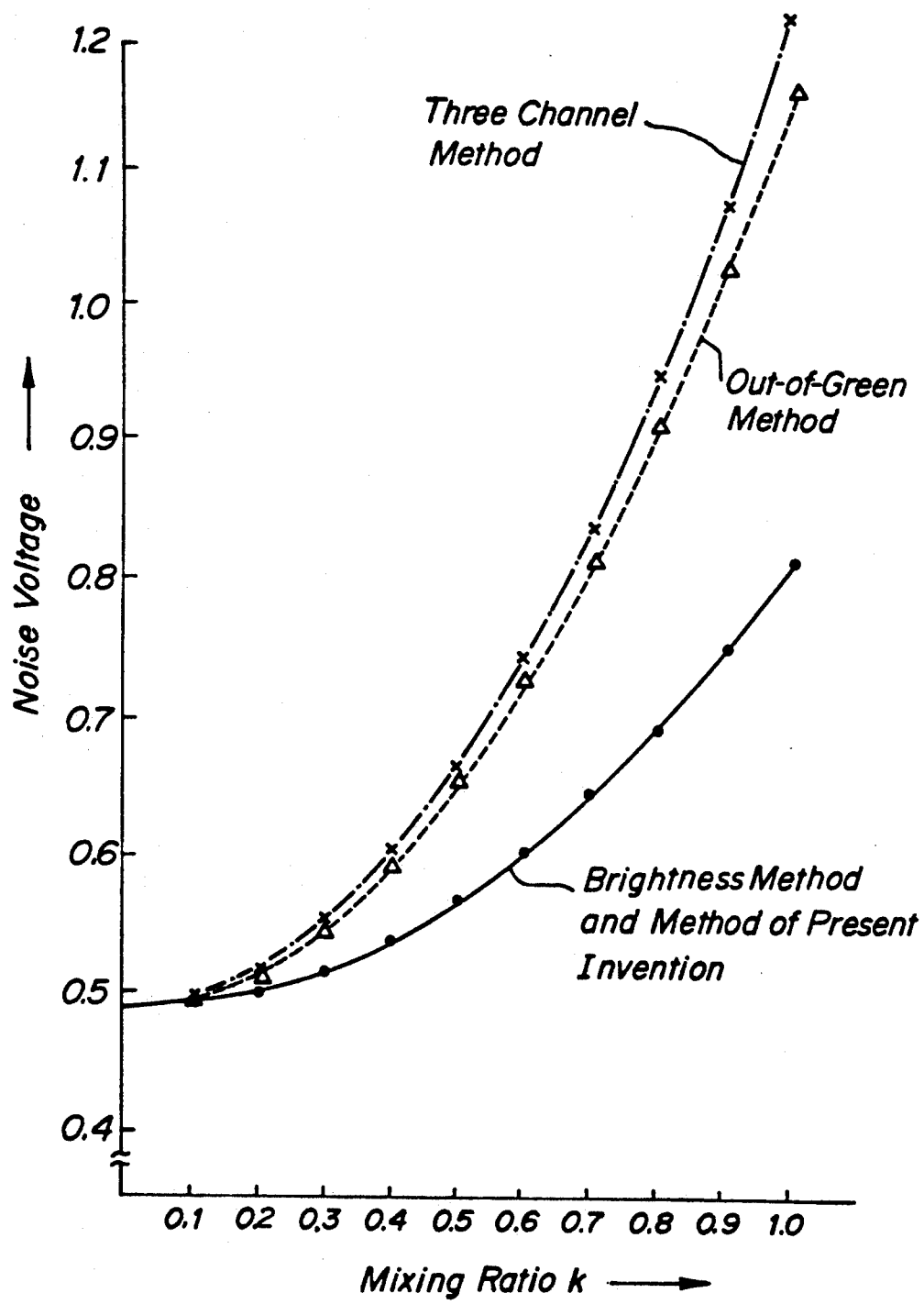
FIG. 7 is a graph representing noise levels of the contour correcting method according to the invention and those of the conventional methods.

FIG. 7 is a graph showing mean square values of noise voltages in the conventional contour correcting methods and the novel method according to the invention with a parameter of the mixing ratio k. In FIG. 7, the curve connecting marks Δ—Δ represents the mean square size voltage generated in the known out-of-green method, the curve connecting marks ×—× that of the known three-channel method and the curve connecting marks —· shows those of the brightness method and the method according to the present invention. As stated above, since the SN ratio in the blue channel is worse by two or three times that of the red and green channels, the means square values of noise voltages shown in FIG. 7 are measured under the condition that the SN ratios in the red and green channels are the same but the SN ratio in the blue channel is lower by 6 dB than that of the red and green channels. The ordinate axis shows a relative value of the mean square value of noise voltage as a relative value with respect to the mean square value of the noise voltage in the green channel. As is clear from FIG. 7, in the out-of-green method and the three channels method, the noise voltage is suddenly increased in accordance with the increase of the mixing ratio k, but in the brightness method and the method according to the present invention, the noise voltage is not increased so much although the mixing ratio k is increased. That is to say, in the method according to the invention, it is possible to limit the noise level as well as the conventional brightness method. It should be noted that according to the invention, the drawback of the known brightness method can be removed.

As stated in the above, according to the present invention, the contour signals are independently extracted from the image signals which are obtained in a plurality of color channels; the thus obtained contour signals are mixed with each other at a constant or variable mixing ratio to produce a contour correction signal; and the contour correction signal is added to the image signals of the respective color channels. Therefore, the noise included in the contour signals is averaged and then decreased to a lower level. Thus, it is possible to effectively prevent the decrease in the SN ratio which might be caused by correcting the contour of the image signal. Furthermore, since the contour signals are extracted in each channel independently from each other, it is possible to process the contour signals in a proper manner in accordance with the usage of the television camera and the desired production effects.

The present invention is not limited to the embodiments explained above, but many modifications may be conceived by those skilled in the art within the scope of the invention. For instance, the present invention may be equally applied not only to the RGB television camera, but also to YRB and YRGB television cameras.

What is claimed is:

1. A method of correcting a contour of an image comprising the following steps:

deriving contour signals in the vertical and horizontal directions from image signals appearing in a plurality of channels;

mixing the contour signals in the vertical direction with each other at a first mixing ratio to produce a vertical contour correction signal;

mixing the contour signal in the horizontal direction in sail plurality of channels with each other at a second mixing ratio to produce a horizontal contour correction signal;

mixing the vertical contour correction signal and the horizonal contour correction signal with each other at a third mixing ratio to produce a composite contour correction signal; and adding said composite contour correction signal to said image signals in said plurality of channels.

2. A method according to claim 1, in which:

said first mixing ratio, at which said contour signals in the vertical direction of the respective channels are mixed with each other and said second mixing ratio, at which said contour signal in the horizontal direction of the respective channels are mixed with each other, can be adjusted independently from each other.

3. A method according to claim 1 in which:

said third mixing ratio, at which said contour correction signal in the vertical direction is mixed with said contour correction signal in the horizontal direction, can be adjusted independently from said first and second mixing ratios.

4. A method according to claim 1, wherein:

said contour signals in the vertical direction are produced in such manner that a first delay signal M, which is delayed from a mon-delay signal T by one horizontal scanning period, and a second delay signal B, which is delayed from said non-delay signal T by two horizontal scanning periods, are generated in each channel; and the sum of said second delay signal B and said non-delay signal T is subtracted from twice said first delay signal 2M in each channel;

said contour signals in the horizontal direction are produced in such manner that a third delay signal C, which is delayed from a non-delay signal by 100 to 140 ns in each channel, and a fourth signal D is generated in each channel; and the fourth signal D in each channel is subtracted from the third delay signal C in each channel; and said composite contour correction signal is added to the first delay signal to correct said image both in the vertical and horizontal directions.

5. A method according to claim 2, in which: said third mixing ratio, at which said contour correction signal in the vertical direction is mixed with said contour correction signal in the horizontal direction, can be adjusted independently from said first and second mixing ratios.

6. A method of correcting a contour of an image comprising the following steps:

deriving contour signals in the vertical direction from image signals appearing in a plurality of channels, said contour signals being produced in such a manner that a first delay signal M, which is delayed from a non-delay signal T by one horizontal scanning period, and a second delay signal B, which is delayed from the non-delay signal by two horizontal scanning periods, are generated in each channel; and the sum $(T+B)$ of said second delay signal B and said non-delay signal T is subtracted from twice said first delay signal 2M in each channel;

mixing said contour signals in the vertical direction with each other at a first mixing ratio to generate a vertical contour correction signal: and adding said vertical contour correction signal to said first delay signal M to correct the contour of said image in the vertical direction.

7. A method according to claim 6, wherein said contour signals produced in said plurality of channels are processed by noise slicers whose slice levels are adjustable independently from each other.

8. A method according to claim 6, wherein:

the mixing ratio at which said contour signals produced from said image signals appearing in the plurality of channels are mixed with each other is varied in accordance with the signal levels of the respective image signals.

9. A method according to claim 8, wherein the signal levels of said image signals are detected in the respective channels; the signal levels of said contour signals are controlled in accordance with the thus detected signal levels of said image signals in the respective channels; and the contour signals whose levels have been controlled are mixed with each other at a fixed mixing ratio to generate the contour correction signal.

* * * * *